US011455377B2

(12) United States Patent
Casey et al.

(10) Patent No.: US 11,455,377 B2
(45) Date of Patent: *Sep. 27, 2022

(54) METHODS AND SYSTEMS FOR THE RESERVATION AND REGISTRATION OF INTERNET OF THINGS DEVICE LICENSES

(71) Applicant: CenturyLink Intellectual Property LLC, Broomfield, CO (US)

(72) Inventors: Steven M. Casey, Littleton, CO (US); Felipe Castro, Erie, CO (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 22 days.

This patent is subject to a terminal disclaimer.

(21) Appl. No.: 16/936,911

(22) Filed: Jul. 23, 2020

(65) Prior Publication Data

US 2020/0410068 A1  Dec. 31, 2020

Related U.S. Application Data

(63) Continuation of application No. 15/857,423, filed on Dec. 28, 2017, now Pat. No. 10,726,106.

(60) Provisional application No. 62/492,491, filed on May 1, 2017.

(51) Int. Cl.
| | |
|---|---|
| *G06F 21/10* | (2013.01) |
| *H04W 4/02* | (2018.01) |
| *G06F 21/12* | (2013.01) |
| *H04L 41/082* | (2022.01) |
| *H04L 41/5003* | (2022.01) |

(52) U.S. Cl.
CPC .......... *G06F 21/105* (2013.01); *G06F 21/121* (2013.01); *H04L 41/082* (2013.01); *H04W 4/02* (2013.01); *H04L 41/5003* (2013.01)

(58) Field of Classification Search
CPC ... G06F 21/105; G06F 21/121; H04L 41/082; H04L 41/5003; H04W 4/02
USPC .......................................................... 726/26
See application file for complete search history.

(56) References Cited

U.S. PATENT DOCUMENTS

| 8,973,155 | B2 | 3/2015 | Iwai | |
| 10,154,020 | B1 | 12/2018 | Bolotin | |
| 2011/0029318 | A1* | 2/2011 | Pucar Rimhagen | .... G06F 21/10 |
| | | | | 705/1.1 |
| 2011/0296405 | A1 | 12/2011 | Ogura | |
| 2014/0244017 | A1 | 8/2014 | Freiwirth | |
| 2014/0366162 | A1 | 12/2014 | Carroll | |
| 2015/0296484 | A1 | 10/2015 | Ekberg | |
| 2016/0314447 | A1* | 10/2016 | Trevathan | .......... G06Q 30/0609 |
| 2017/0104609 | A1 | 4/2017 | McNamee | |

(Continued)

*Primary Examiner* — Bryan F Wright

(57) ABSTRACT

Novel tools and techniques for an IoT shell are provided. A system includes an internet of things (IoT) device, a database, and a license manager. The database may include one or more sets of authorized licenses, each set of authorized licenses associated with a respective vendor software. The license manager may be in communication with the IoT device and the database, and further include a processor and a non-transitory computer readable medium comprising instructions executable by the processor. The license manager may be configured to receive a request to reserve a license for a first vendor software, determine an availability of the license associated with the first vendor software, register a unique identifier of the IoT device in association with the license, and grant the license to the IoT device.

19 Claims, 5 Drawing Sheets

(56) References Cited

U.S. PATENT DOCUMENTS

2017/0105131 A1    4/2017  Song
2018/0218466 A1*   8/2018  Mowatt ................ G06Q 50/184
2018/0314808 A1    11/2018 Casey et al.

* cited by examiner

METHODS AND SYSTEMS FOR THE RESERVATION AND REGISTRATION OF INTERNET OF THINGS DEVICE LICENSES

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to a software management system, and more particularly to a scalable, dynamic, software management system in an IoT platform.

BACKGROUND

Devices found in homes and businesses are increasingly becoming interconnected. Smart, network-connected devices, such as household appliances, televisions, personal electronics, vehicles, heating, ventilation, and air conditioning (HVAC) systems, sprinkler systems, light bulbs, utility meters, and industrial equipment and telemetry devices permeate modern homes and commercial/industrial spaces. Many manufacturers and vendors provide devices that operate within their own proprietary internet of things (IoT) ecosystems, each with running versions of proprietary and/or third-party software/firmware.

Once deployed, software and/or firmware on the IoT devices may or may not be updated by the user or a vendor of the IoT device. Moreover, IoT devices may utilize licensed software for various services and functions. The number of IoT devices utilizing a license may fluctuate dynamically at any given time, as new IoT devices are deployed and older IoT devices are disabled, and usage of the IoT devices may fluctuate across different regions depending on the time of day.

Accordingly, tools and techniques for an IoT devices and services software management is provided below.

BRIEF DESCRIPTION OF THE DRAWINGS

A further understanding of the nature and advantages of the embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Figure 1:
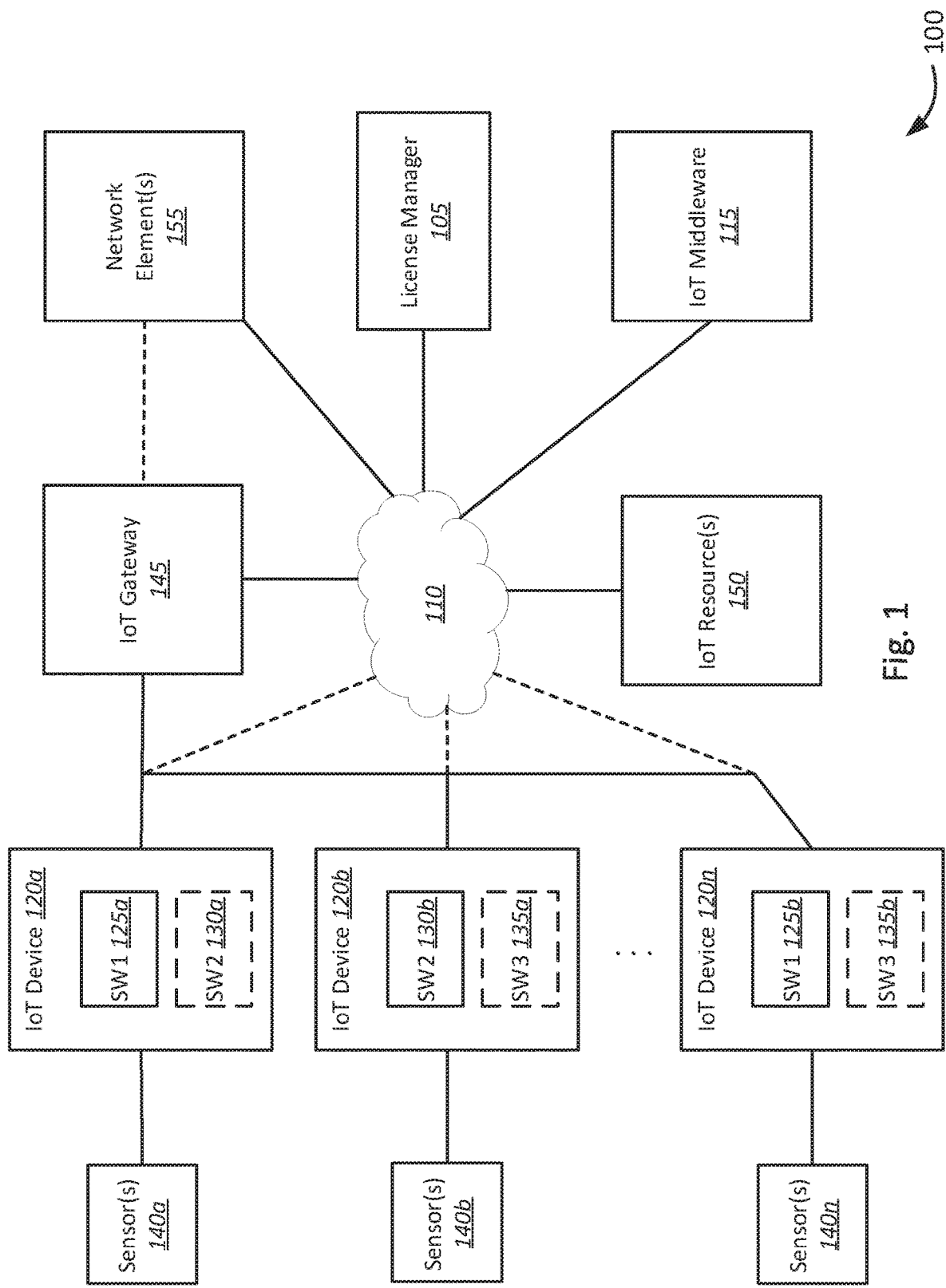
FIG. 1 is a schematic block diagram of a system for IoT devices and services software management, in accordance with various embodiments.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

The various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible, and/or non-transitory computer readable media (such as, to name but a few examples, optical media, magnetic media, and/or the like).

In an aspect, a system for IoT devices and services software management is provided. The system may include an IoT device, a database, and a license manager. The IoT device may be in communication with one or more sensors. The database may include one or more sets of authorized licenses, each set of authorized licenses associated with a respective vendor software. The license manager may be in communication with the IoT device and the database, and may include a processor and a non-transitory computer readable medium comprising instructions executable by the processor to perform various functions. Accordingly, in some embodiments, the license manager may be programmed to receive, via the IoT device, a request to reserve a license of a first set of one or more authorized licenses associated with a first vendor software. The license manager may further be configured to determine, via the database, an availability of the license associated with the first vendor software. Responsive to determining that the license is available, the license manager may be configured to register, via the database, a unique identifier of the IoT device, wherein by registration the unique identifier is associated with the license. Then, the license manager may be configured to grant the license to the IoT device.

In a further aspect, an apparatus for IoT devices and services software management is provided. The apparatus may include a processor and a non-transitory computer readable medium comprising instructions executable by the processor. Accordingly, the apparatus may be programmed to receive, from an IoT device, a request to reserve a license of a first set of one or more authorized licenses associated with a first vendor software. The apparatus may further be programmed to determine, via a license database, an availability of the license associated with the first vendor software. In response to determining that the license is available, the apparatus may further register, via the license database, a unique identifier of the IoT device, wherein by registration the unique identifier is associated with the license. The apparatus may then grant the license to the IoT device.

In a further aspect, a method of IoT devices and services software management. The method may include receiving, via a license manager, a request to reserve a license of a first set of one or more authorized licenses associated with a first vendor software. The method may continue by determining, via the license manager, an availability of the license associated with the first vendor software. The method may further include registering, via the license manager, a unique identifier of the IoT device, in response to determining that the license is available, with a database including the first set of one or more authorized licenses associated with the first vendor software, wherein by registration the unique identifier is associated with the license. The method continues by granting, via the license manager, the license to the IoT device.

Various modifications and additions can be made to the embodiments discussed without departing from the scope of the invention. For example, while the embodiments described above refer to specific features, the scope of this invention also includes embodiments having different combination of features and embodiments that do not include all the above described features.

FIG. 1 is a schematic block diagram of a system 100 for IoT devices and services software management, in accordance with various embodiments. The system 100 may include a license manager 105, network 110, IoT Middleware 115, IoT devices 120a-120n (collectively "the plurality of IoT devices 120"), a first instance of software 1 (SW1) 125a and a second instance of SW1 125b (collectively "the instances of SW1 125"), a first instance of software 2 (SW2) 130a and a second instance of SW2 130b (collectively "the instances of SW2 130"), a first instance of software 3 (SW3) 135a and a second instance of SW3 135b (collectively "the instances of SW3 135"), one or more sensors 140a-140n (collectively "the plurality of sensors 140"), IoT gateway 145, one or more IoT resources 150, and one or more network elements 155.

In various embodiments, the license manager 105 may be coupled, via network 110, to a plurality of IoT devices 120. In some embodiments, an IoT gateway 145 may couple each of the plurality of IoT devices 120 to the network 110. Alternatively, each of the plurality of IoT devices 120 may be configured to be coupled directly to the network 110. The plurality of IoT device 120 may further be configured to access one or more IoT resources 150 via the network 110. A plurality of sensors 140 may further be provided. Each of the plurality of IoT devices 120 may further be coupled to a respective sensor 140a-140n of the plurality of sensors 140. An IoT middleware 115 may further be provided. The IoT middleware 115 may be coupled to the IoT gateway 145, or individual IoT devices 120a-120n, via the network 110. In some embodiments, the IoT middleware 115 may further be coupled to the license manager 105 via the network 110. One or more network elements 155 may further be coupled to the license manager 120, IoT middleware 115, plurality of IoT devices 120, the IoT gateway 145, or the one or more IoT resources 150 via the network 110. It should be noted that the system 100 and its components are schematically illustrated in FIG. 1, and that modifications to the systems 100 or components may be possible in accordance with various embodiments.

In various embodiments, each of the plurality of IoT devices 120 may be configured to run different instances of one or more different software programs. Software programs may include programs and applications which may be loaded locally at an IoT device 120a-120n, retrieved from an IoT resource 150, or remotely executed by an IoT resource 150 (e.g. a server) in communication with an IoT device 120a-120n. For example, a first IoT device 120a may include a first instance of SW1 125a, and first instance of SW2 130a. A second IoT device 120b may include a second instance of SW2 130b, and a first instance of SW3 135a. An nth IoT device 120n may include a second instance of SW1 125b and a second instance of SW3 135b. Each of the plurality of IoT devices 120 may further be coupled to a respective one or more sensors 140a-140n of a plurality of sensors 140. For example, various sensor types may be utilized in the plurality of sensors 140, including, without limitation, photodetectors, scales, gyroscopes, global positioning system (GPS) receiver, cameras, microphones, moisture readers, thermometers, smart-grid sensors, accelerometers, rangefinders, and motion detectors. In some embodiments, the plurality of sensors 140 may be locally coupled to a respective IoT device 120a-120n, while in other embodiments, the plurality of sensors 140 may be configured to be accessed remotely. Thus, the first IoT device 120a may be coupled to one or more first sensors 140a, the second IoT device 120b may be coupled to one or more second sensors 140b, and the nth IoT device 120n may be coupled to one or more nth sensors 140n. In various embodiments, one or more of the instances of SW1 125, instances of SW2 130, and instances of SW3 135 may be licensed or require a license to be run. In some embodiments, the instances of SW1 125, instances of SW2 130, and instances of SW3 135 may be configured to be executable, by the IoT device 120a-120n, to allow a respective IoT device 120a-120n to access various IoT resource(s) 150, including, without limitation, one or more sensors 140a-140n, data streams produced by the one or more sensors 140a-140n, cloud-based services and tools, and other IoT devices. In further embodiments, the instances of SW1 125, instances of SW2 130, and instances of SW3 135 may be configured to be executable, by the IoT device 120a-120n, to allow an external device, such as the IoT middleware 115, an IoT resource 150, a user device, or IoT gateway 145 to access data generated by the one or more sensors 140a-140n. Accordingly, each of the plurality of IoT devices 120 may include, without limitation, a single-board computer, microcontroller unit (MCU) board, field programmable gate array (FPGA), application specific integrated circuit (ASIC), a system on a chip (SoC), or other type of embedded system, configured to run the respective instances of SW1 125, instances of SW2 130, and instances of SW3 135.

In various embodiments, the license manager 105 may be coupled to one or more of the IoT devices 120a-120n, via the network 110, or IoT gateway 105. The license manager 105 may be configured to manage, monitor, and track the instances of SW1 125, instances of SW2 130, and instances of SW3 135 in use by the plurality of IoT devices 120. In further embodiments, the license manager 105 may be coupled to one or more IoT resources 150, including a server with one or more licenses for running or providing instances of SW1 125, instances of SW2 130, and instances of SW3 135 for use by one or more of the IoT devices 120a-120n. The license manager 105 may include, without limitation, hardware, software, or both hardware and software. For example, the license manager may be a hardware appliance or tool, a server computer, web portal, or application running on a server computer. Accordingly, the license manager 105 may be executable by one or more processors, such as a central processing unit (CPU), graphics processing unit (GPU), digital signal processing (DSP) chips, FPGA, ASIC, SoC, or other type of embedded processor, running on a single-board computer or MCU board platform. In yet further embodiments, the license manager 105 may be software executable on one or more of the IoT devices 120a-120n. In some embodiments, the license manager may be run on multiple IoT devices of the plurality of IoT device 120 devices in a distributed manner, with each IoT device 120a-120n of a platform managing its own and others' license requests. In other embodiments, one IoT device 120a-120n or a cluster of one or more IoT devices 120a-120n may be coupled to the other IoT devices of the plurality of IoT devices, and configured to run the license manager 105 in a more centralized manner.

The license manager 105 may further be configured to communicate with other network elements 155 (e.g., an access point) over network 110. In various embodiments, the license manager 105 may further include, by way of example, and without limitation, a data server, web server, index, list, or database (e.g., a software license database). In some embodiments, the database of the license manager 105 may be locally integrated into the hardware of the license manager 105, or may be a remote database accessible via a network, such as network 110, by the license manager 105.

The network 110 may include, without limitation, any type of network familiar to those skilled in the art that can support data communication. For example, various embodiments may employ, without limitation, a local area network (LAN); a wide-area network including low-power wide area network (LPWAN), long range wide area network (LoRaWAN), narrowband IoT (NB-IoT); Neul; Sigfox; Ingenu; IPv6 over low-power wireless personal area network (6LoWPAN); Thread; near field communications (NFC); radio frequency identification (RFID); a virtual network, such as a virtual private network (VPN); the Internet; an intranet; an extranet; a public switched telephone network (PSTN); an infra-red network; a wireless network, including without limitation a network operating under any of the IEEE 802.11 suite of protocols, including the Bluetooth™ protocol known in the art, or any other wireless protocol; a cellular voice or data network (e.g., 2G, 3G, 4G, 5G & long term evolution (LTE)); or any combination of these and other networks.

In various embodiments, each IoT device 120a-120n of the plurality of IoT devices 120 may be configured to communicate with each other. For example, in some embodiments, the first IoT device 120a may be configured to communicate with the second IoT device 120b. Thus, in various embodiments, a device, user, or software tool, such as the license manager 105m, may be able to ping or obtain data about a first IoT device 120a via another IoT device (e.g., the second IoT device 120b) coupled to the first IoT device 120b. In further embodiments, an IoT gateway 145 may be provided. An IoT gateway 145 may be configured to provision, manage, and organize the plurality of IoT devices 120. In various embodiments, the IoT gateway 145 be configured to further allow one or more of the plurality of IoT devices 120 to access various IoT resources 150 via network 110, the IoT middleware 115 to communicate with one or more of the plurality of IoT devices 120, or to allow an IoT device 120a-120n to communicate with the other IoT devices of the plurality of IoT devices 120. The IoT gateway 145 may include, without limitation, gateway devices, such as a residential gateway, modems, routers, access points, or other communication nodes. The IoT gateway 145 may be accessible, over network 110, to receive requests from customers or providers to provision additional IoT devices to the plurality of IoT devices 120, and a respective one or more sensor to the plurality of sensors 140. The IoT gateway 145 may be configured to provision, make accessible, or obtain access to IoT resources, and to make the plurality of IoT devices accessible. Accordingly, in some embodiments, the IoT gateway 145 may be configured to allow a license manager 105 to gain access to one or more of the plurality IoT devices 120.

In various embodiments, the license manager 105 may further be in communication with one or more different types of network element(s) 165. Network element(s) 165 may include network devices configured to couple an internet service provider's central office to a customer's premises. For example, in various embodiments, the network element(s) 165 may include, without limitation, databases, routers, switches, firewalls, broadband remote access servers (BRAS), cable modem termination systems (CMTS), digital subscriber line access multiplexers (DSLAM), optical line termination (OLT), network interface devices (NID), optical network terminal (ONT), residential gateways, modems, set top boxes, and other like devices. In various embodiments, the network element(s) 165 may further be coupled to the IoT gateway 145.

In various embodiments, each of the plurality of IoT deices 120 may be associated with a respective unique identifier. The unique identifier may serve to identify the specific IoT device 120a-120n. The unique identifier may include, without limitation, an internet protocol (IP) address, media access control (MAC) address, location information, serial number, model number, customer information or identification, international mobile station equipment identity (IMEI), mobile equipment identifier (MEI), or other identifier suitable to uniquely identify a respective IoT device 120a-120n.

According to various embodiments, the IoT gateway 145, or alternatively an IoT device 120a-120n, associated with a first customer may generate a request for an IoT resources

150. The request may include a request for a system, application, or other resources available from a service provider, which may include one or more instances of SW1 125, SW2 130, and SW3 135. Based on the request, the IoT gateway 145 and/or IoT resource 150 may be configured to provision one or more instances of SW1 125, SW2 130, SW3 135 to a requesting IoT device 120*a*-120*n* associated with the first customer. Similarly, a different IoT gateway 145 and/or IoT device 120*a*-120*n*, associated with a second customer, may generate a request for IoT resources 150, which may include one or more instances SW1 125, SW2 130, and SW 135. Based on this request, the network orchestrator 160 may provision VM2 120*b* with software in the form of a second instance of SW2 130*b* and a first instance of SW3 135*a*. Accordingly, IoT resources 150 may be provisioned for a plurality of customers, the final customer being customer "n." Thus, for example, one or more IoT devices 120*a*-120*n* may be associated with a first customer, one or more IoT devices 120*a*-120*n* may be associated with a second customer, and one or more IoT devices 120*a*-120*n* may be associated with an nth customer. In some further embodiments, each customer may be associated with a respective IoT gateway 145.

Thus, network resources 150 may be provisioned for each customer, with multiple instances of SW1 125, SW2 130, and SW3 135. For example, a first IoT device 120*a* may be associated with a first customer, and may be provisioned with a first instance SW1 125*a* and a first instance of SW2 130*a*. A second IoT device 120*b* may be associated with a second customer, and may be provisioned with a second instance of SW2 130*b* and a first instance of SW3. The third IoT device 120*n* may be associated with an nth customer, and may be provisioned with a second instance of SW1 125*b* and a second instance of SW3 135*b*. In various embodiments, the requested IoT resources 150, for example instances of SW1 125, SW2 130, and SW3 135, may be provisioned after confirmation of the availability of a license via the license manager 105. Thus, the license manager 105 may be configured to first confirm the availability of a license for each requested instance of SW1 125, SW2 130, and SW3 135. In further embodiments, the availability of licenses may be confirmed to provision, execute, or otherwise provide access to other IoT resources 150 (e.g., licensed services and/or software), an IoT middleware 115, or IoT gateway 145. For example, the IoT middleware 115 may be hardware, software, or a combination of hardware and software, such as a network appliance or tool, a server computer, web portal, or application running on a server computer, configured to gather data, perform analytics, interface communications between various IoT devices 120*a*-120*n* and sensors 140*a*-140*n*, and provide other management functions over the plurality of IoT devices 120. The IoT middleware 115 may, thus, be provided by a third-party vendor and may be licensed for use by a customer, device vendor, or IoT service provider. Thus, in some embodiments, the license manager 105 may be configured to confirm the availability of licenses for the IoT middleware. In further embodiments, one or more of the IoT devices 120*a*-120*n* may be deployed with instances of SW1 125, SW2 130, and/or SW3 135. The IoT devices 120*a*-120*n* may, in turn, be configured to access or run the respective instances of SW1 125, SW2 130, and/or SW3 135 after retrieving a license from the license manager 105. Accordingly, the license manager 105 may be configured to determine whether a license is available for the requested instance of SW1 125, SW2 130, and/or SW3 135, or other IoT resources 150. In some embodiments, the license manager 105 may be configured to "check-out" a license held by the customer, IoT device vendor, or IoT service provider to a requesting device. For example, checking-out a license may include, without limitation, confirming that a license is available for the requested IoT resource 150, and allowing the requesting IoT device 120*a*-120*n* to obtain and/or execute the instance of SW1 125, SW2 130, and/or SW3 135, or to access a requested IoT resources 150. In some further embodiments, as manufacturers of IoT devices discontinue support for certain devices, the license manager 105 may be configured to revoke licenses for software on the specific IoT device 120*a*-120*n* being discontinued. In some embodiments, IoT devices may dynamically added or removed from the plurality of IoT devices 120. Accordingly, the license manager 105 may be configured to grant and/or acquire licenses dynamically, responsive to a new IoT device 120*a*-120*n* being initialized and the IoT device 120*a*-120*n* reporting its status to a manufacturer. For example, the license manager 105 may be configured to confirm that a unique identifier of an IoT device has come online and reported itself to its respective manufacturer, before licenses are granted or acquired. Therefore, in some embodiments, IoT device vendors and/or IoT service providers may avoid utilizing licenses on IoT devices that have not been purchased or that have not yet been used after purchase.

In various embodiments, the license manager 105 may be configured to track a total number of licenses, the number of available licenses, and the licenses granted (e.g., "checked-out") to various requesting devices (e.g., IoT devices 120*a*-120*n* and/or IoT gateway 145). For example, in some embodiments, as described above, the license manager 105 may be configured to maintain a database of available licenses for instances of SW1 125, SW2 130, and SW3 135. Thus, in one set of embodiments, a request to reserve a license for a software instance may be generated by an individual IoT device 120*a*-120*n*, an IoT gateway 145, or other IoT resources 150 (e.g., a remote device or server associated with a IoT service provider, IoT device vendor, or a customer). The license manager 105 may be configured to receive a request to reserve a license for the software instance. For example, the license manager 105 may receive a request to reserve a license for a first instance of SW1 125*a*. The license manager 105 may then determine, via the database of available licenses, whether a license for SW1 125 is available to the requesting party (e.g., a customer, IoT device vendor, or IoT service provider, or third party).

In some embodiments, the availability of at least some licenses of a total number of available licenses may be determined based on a current, real-time availability of a license. Thus, available licenses may be granted to requesting devices in a first-come, first-serve basis. In further embodiments, the license manager 105 may be configured to determine the availability of a license based on a predicted availability of a license or scheduled availability of a license. For example, a license for a software instance may be scheduled to be reserved in advance, or priority to receive a license may be given to a specific requesting device or customer. Accordingly, in some embodiments, the license manager 105 may be configured to determine when and how many licenses will be checked out in the future or become available in the future, based on, for example, scheduled requests for licenses, or predictively based on historic usage. In some further embodiments, the license manager 105 may be configured to grant licenses for a specific amount of time, or a request for the license may indicate an amount of time to use the license. The license manager 105 may be configured to notify the requesting device regarding when a license is expected to become available. In some embodiments, the license manager 105 may maintain a queue of requesting devices if multiple devices request licenses that are not available. In some embodiments, the license manager 105 may be configured to grant a license based on a priority level. For example, in some embodiments, the license manager 105 may be configured to determine whether the priority level of a device currently using a license is lower than the priority level of a requesting device. If the priority level of the requesting device (or customer) is higher than that of a device currently using a license, the license manager 105 may be configured to revoke the license from the device currently using the license, and grant the license to the requesting device (or customer) with the higher priority level.

If the license manager 105 determines that a license is available, the license manager 105 may be configured to register a unique identifier of the requesting device, such as a respective IoT device 120a-120n, IoT gateway 145, or an IoT resource 150 (e.g., an IoT resource 150 requesting a license for a licensed software instance or other IoT resource 150 requiring a license), and associating the unique identified with the license. Thus, a respective available license will be tied to the requesting device utilizing the license. In some examples, licenses may be tracked by a license identifier assigned by the software vendor of the software instance, or in some embodiments, as assigned by the license manager 105.

In various embodiments, the license manager 105 may be configured to grant or deny a license to the requesting device based on the confirmation of its availability. In some examples, granting or denying a license may include granting or denying permission/access to a requesting device to obtain, or execute the requested instance of software or IoT resource 150. For example, the first IoT device 120a may be configured to transmit a request to execute a first instance of SW1 125a, and a first instance of SW2 130a to the license manager 105. The license manager 105 may then determine whether a license for instances of SW1 125 are available. If a license for instances of SW1 125 is determined to be available, the license manager 105 may grant a license to the first IoT device 102a.

In a similar manner, the second IoT device 120b may also request a license for a respective second instance of SW2 130b. The license manager 105 may check the license database to determine the availability of a second license for the instance of SW2 130b requested by the second IoT device 120b. If the license manager 105 determines that a license is available, the license manager 105 may register a unique identifier of the second IoT device 120b in association with the available license for the second instance of SW2 130b. In various embodiments, the same procedure may be repeated for the instances of SW1 125, SW2 130, and SW3 135 running on IoT devices 120a-120n.

In various embodiments, a certain number of licenses may be provided to the customer, IoT device vendor, or IoT service provider by a software vendor of the respective software SW1 125, SW2 130, and SW3 135. In other embodiments, a certain number of licenses may be provided to the customer directly, and the customer may provide the license information to the license manager 105 to manage its licenses of the across each of the customer's VM instances 120, 145.

In some embodiments, the total number of licenses for SW1 125 may be limited. For example, in some embodiments, the number of licenses for SW1 125 may be limited to two licenses. When another requesting device (e.g., a different IoT device of the plurality of IoT devices 120) requests a license to run a third instance of SW1 125, the license manager 105 may not grant a license to the requesting device until a license in use by the first and second IoT devices 120a, 120b becomes available. In some embodiments, when the first IoT device 120a has finished using the first instance of SW1 125a, the first IoT device 120a may be configured to send an indication to license manager 105 that it is no longer running its instance of SW1 125a. The license may then be disassociated from the identifier of the first IoT device 120a and labeled as available. In other embodiments, the license manager 105 may monitor the first IoT device's 120a usage of SW1 125a. If license manager 105 detects that SW1 125a has been idle for a threshold duration of time, license manager 105 may recall the license issued to the first IoT device 120a to run the first instance of SW1 130a. In further embodiments, various conditions may be placed on the recalled license for the first instance of SW1 125a, such as giving priority to the first IoT device 120a to once again use the license. A similar process may be used to determine if the license for the second instance of SW1 125b running on the nth IoT device 120n has become available. Thus, if a license previously associated with either of the two instances of SW1 125a, 125b becomes available, the license manager 105 may grant one of the licenses previously associated with either of the two instances of SW1 125a, 125b.

In some further embodiments, the license manager 105 may further determine a demand for licenses for particular vendor software. For example, in one set of embodiments, license manager 105 may determine, based on the number of requests for licenses, an average concurrent use, or a projected average concurrent use for each of SW1 125, SW2 130, and SW3 135. The license manager 105 may, in some embodiments, determine that more licenses may be needed for one or more of SW1 125, SW2 130, and SW3 135. For example, in some embodiments, as in the example above, SW1 125 may be limited to two licenses. The license manager 105 may then determine that, based on the requests for SW1 125, that SW1 125 has a projected average concurrent use of three licenses. Thus, license manager 105 may indicate to the customer, IoT device vendor, or IoT service provider that more licenses for SW1 125 are needed. In some embodiments, the license manager 105 may be configured to automatically acquire additional licenses from a software vendor of SW1 125. In yet further embodiments, the license manager 105 may be configured to dynamically acquire more licenses of the particular software SW1, 125, SW2 130, SW3 135 as needed, or decrease the number of licenses of SW1 125, SW2 130, or SW3 135, in-real time, corresponding to the demand for licenses, as determined from the requests received by the license manager 105.

In another set of embodiments, the license manager 105 may make licenses available based on a service level agreement of the customer associated with a requesting device, such as one or more of the IoT devices 120a-120n, IoT gateway 145, or IoT resource 150. In various embodiments, the license manager 105 may first determine a service level agreement of the specific requesting device (e.g., IoT device 120a-120n), or customer associated with the requesting device before granting a license for the requested software. Based on the service level agreement, the license manager 105 may further determine a priority level of license availability for the requesting device. For example, when multiple IoT devices 120a-120n request an available license, access to the available license may be prioritized based on the priority level, where the IoT device 120*a*-120*n* with a higher priority level may be granted licenses, by the license manager 105, ahead of other IoT devices 120*a*-120*n* with a lower priority level.

In some embodiments, when the license manager 105 receives a request for a license from a first requesting device, such as first IoT device 120*a*, having a first priority level higher than a second priority level of a second requesting device, such as second IoT device 120*b*, already utilizing a license, the license manager 105 may revoke the license from the second IoT device 120*b* having the lower second priority level, and grant the license to the first IoT device 120*a* having the higher first priority level.

In other embodiments, the license manager 105 may ensure that a certain number of licenses of the total number of licenses for particular software (or IoT resources 150) remains available to requesting devices having a high priority level. For example, in some embodiments, out of the total number of licenses, a certain percentage of the total number of licenses may remain available at all times for requesting devices having a high priority level. Requesting devices having a low priority level will not be granted licenses that are reserved for high priority level customers. Thus, the license manager 105 may ensure the availability of licenses based on priority levels.

In another set of embodiments, the license manager 105 may further create and enforce restriction conditions on the use of individual licenses. In various embodiments, the restriction conditions may include, without limitation, geographic restrictions, such as, for example, restrictions based on a region, state, country, continent, time zones, etc.; temporal restrictions, such as date and time, duration, etc.; a restriction on the number of times a software instance may be run; device specific restrictions, such as a network address based restriction; or any other restriction suited to a particular software may be created and implemented. When the conditions specified by the restriction condition occur, the license manager 105 may revoke the granted license. For example, in embodiments utilizing a geographic license restriction, the license manager 105 may be able to detect that a customer has accessed software through one of the plurality of IoT devices 120 from a country in which the software is prohibited. The license manager 105 may be configured to revoke the previously granted license from the specific IoT device 120*a*-120*n*. In another example, embodiments may utilize a temporal restriction condition, such as allowing usage of a license for only a specified period—two hours in this example. Thus, when a license is requested, and the license has been granted to the requesting device, the license manager 105 may begin tracking the amount of time that has elapsed from when the license was granted. After the specified two hours has elapsed, the license manager 105 may revoke the license.

In another set of embodiments, a combination of restriction conditions may be utilized by the license manager 105. For example, in some embodiments, licenses may be made available only to customers for the time period from 8 AM to 5 PM for the particular customer locally. Thus, a software license that is available to a customer belonging to Pacific Time Zone at 3 PM locally may not be available to a customer in the Eastern Time Zone. Therefore, licenses may be made available to customers on a rolling basis as described above. In some embodiments, the restriction conditions may be imposed based on the physical location of a requesting device, such as IoT device 120*a*-120*n*, IoT gateway 145, or IoT resource 150. In various embodiments, the license manager 105 may be able to retrieve location information from the requesting device. For example, the requesting device may be an IoT device 120*a*-120*n* coupled to one or more sensors 140*a*-140*n*. In some embodiments, the respective one or more sensors 140*a*-140*n* may include a GPS receiver. For example, the licenses for the second instance of SW2 130*b* and the first instance of SW3 135*a* granted to the second IoT device 120*b* may be available only in specific states. Licenses for SW2 130 may be available to customers or requesting devices in State A and State B, while licenses for SW3 135 may only be available to customers or requesting devices located in State A. Thus, if the second IoT device 120*b* is determined to be in state B, the license for the first instance of SW3 135*a* may be revoked from the second IoT device 120*b*. According to various embodiments, the license manager 105 may similarly manage software licenses for each of the requesting devices (e.g., plurality of IoT devices 120, IoT gateway 145, or IoT resources 150) in a similar manner.

In this way, the management and tracking functionality of the license manager 105 provides the ability to track licenses for software and services in an IoT environment. The above described embodiments allow for automated management and tracking within an IoT ecosystem from a centrally operable license manager 105. Furthermore, the license manager 105 allows for expanded functionality to create and enforce restriction conditions via the license manager 105.

It is to be understood that in the described examples, the license manager 105 is described in the above embodiments with respect to three software programs (SW1 125, SW2 130, and SW3 135) for purposes of explanation only, and that in other embodiments, licenses for a greater or lesser number of software programs and other IoT resources 150 may be managed by the license manager 105.

Figure 2:
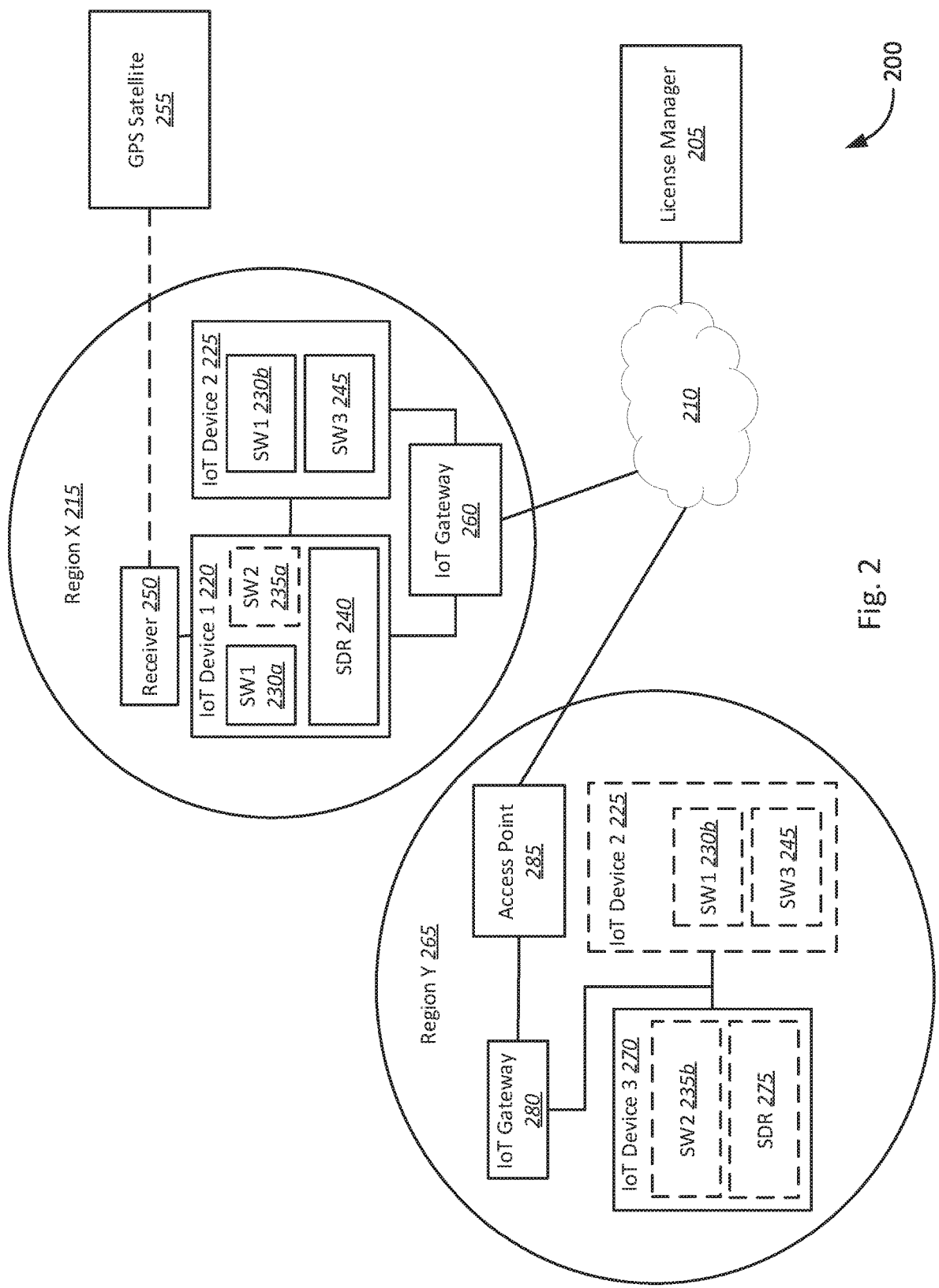
FIG. 2 is a schematic block diagram of a system topology for IoT devices and services software management, in accordance with various embodiments.

FIG. 2 is a schematic block diagram of a system topology 200 for IoT devices and services software management, in accordance with various embodiments. The system topology 200 may include a license manager 205, network 210, IoT device 1 220, IoT device 2 225, GPS receiver 250, GPS satellite X 255, IoT gateway 260, IoT device 3 270, IoT gateway 280, and access point 285. A region X 215 may include the IoT device 1 220, IoT device 2 225, IoT gateway 260, and receiver 250. A region Y 265 may include the IoT device 3 270, IoT gateway 280, and access point 285. The IoT device 1 220 may further include a first instance of SW1 230*a*, a first instance of SW2 235*a*, and a software defined radio (SDR 240). The IoT device 2 225 may include a second instance of SW1 230*b* and an instance of SW3 245. The IoT device 3 270 may include a second instance of SW2 235*b*, and an SDR 275.

In various embodiments, the license manager 205 may be coupled to the network 210, through which the license manager 205 may further be coupled to one or more of IoT device 1 220, IoT device 2 225, IoT device 3 270 via the network 210, IoT gateway 260, IoT gateway 280, and access point 285. The IoT gateway 260 may physically be in region X 215, and coupled to one or more IoT devices physically located in region X 215, including the IoT device 1 220, and IoT device 2 225. Each of the IoT device 1 220 and IoT device 2 225 may be communicatively coupled to each other. The IoT device 1 220 may further be coupled to a receiver 250 in communication with one or more GPS satellites 225 over region X 215. The IoT gateway 280 may physically be in region Y 265, and coupled to one or more IoT device physically located in region Y 265, including the IoT device 3 270, and optionally IoT device 2 225. The IoT gateway 280 may further be coupled to an access point 285, through which the IoT gateway 280, and by extension IoT device 3 270 (and optionally IoT device 2 225), may be coupled to the network 210. It should be noted that the system topology 200 and its components are schematically illustrated in FIG. 2, and that modifications to the system topology 200 may be possible in accordance with various embodiments.

In various embodiments, the IoT gateway 260 may be configured to provision the IoT device 1 220 and IoT device 2 225, connecting the IoT device 1 220 and IoT device 2 225 to various IoT resources, via the network 210. IoT device 1 220 and IoT device 2 225 may be associated with a first customer. Similarly, IoT gateway 280 may be configured to provision the IoT device 3 270, and optionally IoT device 2 225, connecting IoT device 3 270 (and optionally IoT device 2 225) to the network 210, via an access point 285. The access point 285 may be an access point associated with a service provider (such as an internet service provider), or a customer. Access point 285 may include, without limitation, both wired and wireless access points such as routers and modems, and wireless hotspots. The IoT device 3 270 (and optionally IoT device 2 225) may be associated with a second customer.

In various embodiments, the IoT device 1 220 may be configured to request, from the license manager 205, a license to execute or obtain a first instance of SW1 230*a* and a first instance of SW2 235*a*. For example, in some embodiments, the IoT device 1 220 may be loaded and deployed with one or more of the first instance of SW1 230*a* and the first instance of SW2 235*a*. The IoT device 1 220 may further be configured to obtain, from an application server or other IoT resource, one or more of the first instance of SW1 230*a* and the first instance of SW2 235*a* via the network 210.

In some embodiments, the license manager 205 may place a restriction condition on licenses for the instances of SW2 235*a*, 235*b* (235 collectively), based on a local time. For example, as described in previous embodiments, SW2 235 may have a restriction condition such that licenses are only available from 8 AM to 5 PM local time in each respective region 215, 265. In one embodiment, Region X 215 may be three hours ahead of Region Y 265. Accordingly, when the time in Region X 215 reaches 5 pm, the license for SW2 235*a* may be revoked from IoT device 1 220, and granted to IoT device 3 270 to use the second instance of SW2 instance 235*b*. In various embodiments, the local time for IoT device 1 220 may be reported to and/or determined by the license manager 205 by the IoT device 1 220. For example, a local time for the IoT device 1 220 (and other devices in region X 215) may be determined based on a reported location. For example, the IoT device 1 220 may be coupled to the GPS receiver 250 in communication with GPS satellite 255. Accordingly, the IoT device 1 220 may be configured to determine its location via the receiver 250. In further embodiments, the IoT device 1 220 may be configured to determine, via the receiver 250, that the IoT device 1 220 is physically in region X 215. A local time (e.g., the time in region X 215) may then be determined based on the location information of the IoT device 1 220.

Similarly, a location and/or local time of the IoT device 2 225 may be determined by the license manager 205. In various embodiments, IoT device 2 225 may be configured to determine and report a location and/or local time to the license manager 205, via the network 210. In contrast with IoT device 1 220, in some embodiments, the IoT device 2 225 may be configured to determine its location via a reported location from the IoT device 1 220. For example, the IoT device 2 225 may be communicatively coupled to IoT device 1 220 and configured to request or otherwise obtain location data for IoT device 1 220, directly from the IoT device 1 220, IoT gateway 260, or through an IoT middleware. Based on a priori knowledge of its own location relative to IoT device 1 220, the IoT device 2 225 may simply report its location as the same location as IoT device 1 220. Alternatively, the IoT device 2 225 may be configured to determine and report its location to the license manager 205 relative to the location of IoT device 1 220. In yet further embodiments, the IoT device 2 225 may be coupled to one or more sensors, which may be configured to identify its position relative to the IoT device 1 220. Thus, the license manager 205 may use the reported location of the IoT device 1 220 and the reported relative position of the IoT device 2 225 to determine a location of the IoT device 2 225 based on the location of IoT device 1 220. Accordingly, a local time of the IoT device 2 225 may, in some embodiments, be determined based on the reported location information. In some embodiments, IoT device 2 225 may optionally be coupled to IoT device 3 270. In this optional arrangement, the IoT device 2 225 may be configured to report its position, similarly, based on the location of the access point 285.

Similarly, a location and/or local time of the IoT device 3 270 may be determined by the license manager 205. In various embodiments, the IoT device 3 270 may be configured to determine and report a location and/or local time to the license manager 205, via the network 210. In contrast with IoT device 1 220, however, in some embodiments, the IoT device 3 270 may be configured to determine its location based on a priori knowledge of a location of the access point 285. For example, the IoT device 3 270 and/or IoT gateway 280 may be configured to be coupled wirelessly to access point 285. Thus, an approximate location of the IoT gateway 280 and/or IoT device 3 270 may be determined, based on wireless range over which a connection may be established to the access point 285. Accordingly, based on a known location (e.g., region Y 265) of the access point 285 to which the IoT device 3 270 is coupled, a location of the IoT device 3 270 may be determined.

In another set of embodiments, the license manager 205 may be configured to restrict licenses based on the location of a respective customer associated with the IoT devices 220, 225, 270. Thus, in various embodiments, the license manager 205 may determine the location of a customer through a network address of a user device or IoT middleware, requesting access to data from the IoT device 220, 225, 270, such as an IP address. Alternatively, the location of the customer may be determined based on location information provided by the customer, such as a physical street address for an office; through payment information provided by the customer; or any other suitable identifying information, as known to those in the art, from which a customer's location may be determined. In some embodiments, the license manager 205 may obtain customer location information based on customer input, while in other embodiments, the license manager may obtain customer location information from the IoT gateways 260, 280, access point 285, or other intermediate device.

Accordingly, in some embodiments, the customer associated with IoT device 1 225 may be located in a time zone that is eight hours ahead of the customer associated with IoT device 3 270. Thus, the license granted to IoT device 3 270 for the second instance of SW2 235B may be revoked by license manager 205 at 5 PM local time for the customer associated with IoT device 3 270, and provided to IoT device 1 220.

In some embodiments, the restriction condition may be regionally based. For example, in some embodiments, the license for SW2 235 may be restricted from being used in Country A to which Region X 215 belongs. Thus, the license manager may determine that IoT device 220 is in region X 215, via the GPS location as determined by the receiver 250, and reported by the IoT device 1 220. The license manager 205 may be configured to revoke the license for the first instance of SW2 235*a* (if loaded on the IoT device 1 220 by the IoT device vendor) or refuse to grant the license to execute the first instance of SW2 235*a*. Similarly, geographic restriction conditions placed on licenses may be enforced for specific customers, based on the geographic regions of the customers as opposed to the devices, such as the IoT devices 220, 225, 270.

In a further set of embodiments, licenses may be granted and revoked based on a priority given to a respective IoT device 220, 225, 270, or alternatively, to different customers. Thus, in some embodiments, IoT device 3 270 may be given higher priority for license availability than IoT device 1 220. In various embodiments, priority may be given as part of an SLA offered to customers. Thus, if no licenses are available to IoT device 3 270 at a time when a license to run the second instance of SW2 235*b* is requested, the license manager 205 may revoke the license given to IoT device 1 220 for the first instance of SW2 235*a*. In some embodiments, some high-level SLAs with customers may guarantee that a license will be available to the customer on demand; within a specified time period; or available at certain times. Some low-level SLAs may notify the customer that their licenses may be given to customers at a higher priority level and that licenses to software may be revoked, or availability to software licenses may be limited based on the SLA.

Accordingly, the system 100 and system topology 200 of FIGS. 1 & 2 provide expanded management capabilities over conventional audit-based management schemes for tracking various instances of software and authorized licenses. By providing a license manager 105, 205, remote, centralized management of multiple software programs or applications from different vendors is possible. Moreover, audit-based systems merely identify the number of licenses in use and the machines on which the licenses are used. The license manager 105, 205, as previously described, allows software licenses to be granted and revoked, the use of software licenses to be monitored and tracked, and restriction conditions to be defined and enforced, for each software instance and for each software vendor, and remotely via the license manager 105, 205.

Figure 3:
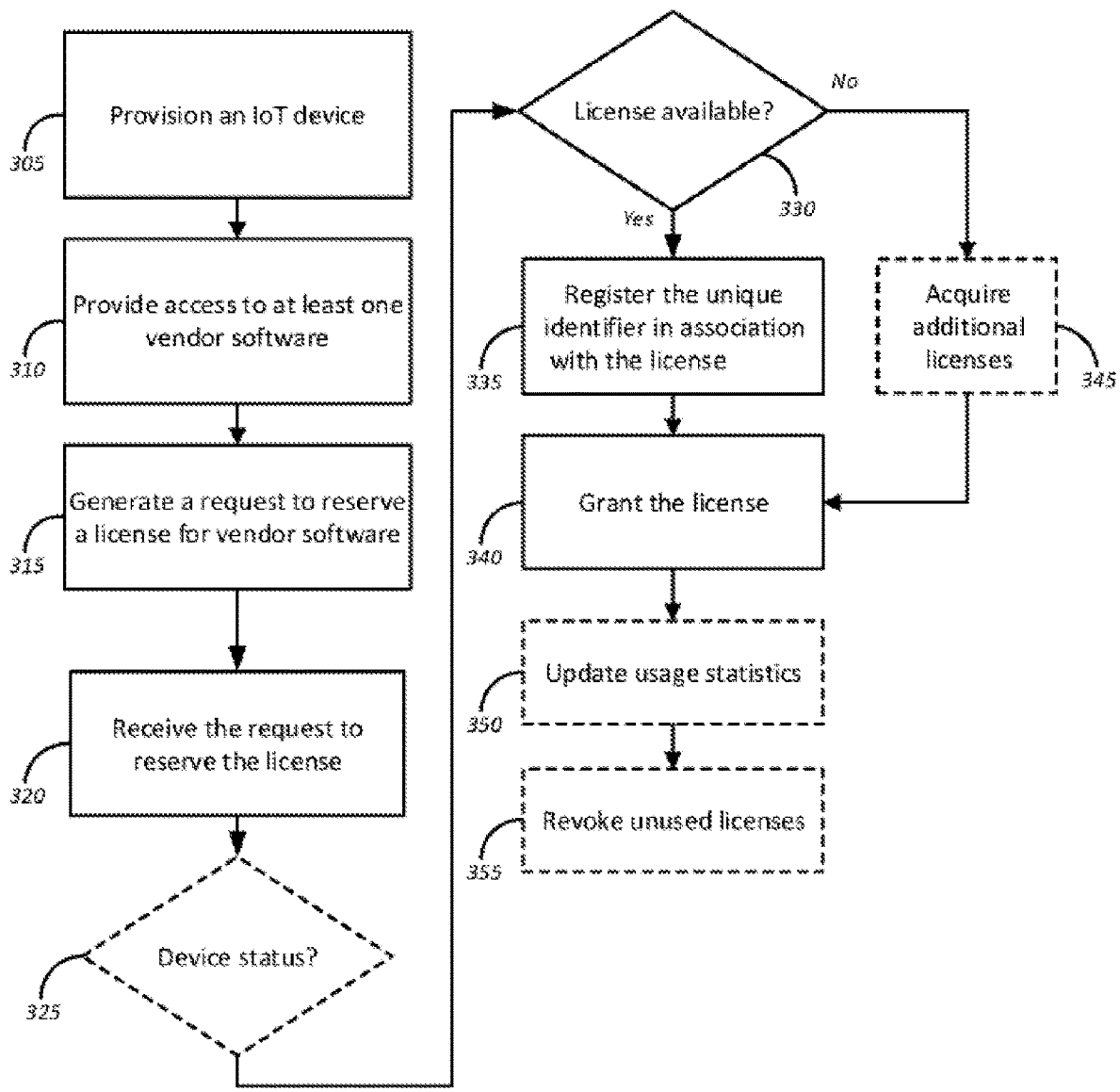
FIG. 3 is a flow diagram of a method of IoT devices and services software management, in accordance with various embodiments.

FIG. 3 is a flow diagram of a method 300 of IoT devices and services software management, in accordance with various embodiments. The method 300 may begin, at block 305, by method 300A begins at block 305, by provisioning an IoT device. In various embodiments, an IoT device may be provisioned by an IoT gateway. The IoT device may be coupled to one or more sensors, IoT resources, server, service provider, and/or vendor via the IoT gateway or other gateway device, or directly be coupled with one or more sensors or other IoT resources. In various embodiments, the IoT device may be provisioned in accordance with a setup request, or automatically upon being powered on and/or connected. In some embodiments, provisioning the IoT device may further include registering an identifier of the IoT device with an IoT gateway, license manager, or an IoT device vendor/manufacturer.

At block 310, the method 300 may continue by providing access to at least one vendor software instance. In some embodiments, the IoT device may be pre-loaded with one or more instances of vendor software. Upon being provisioned, the IoT device may be given access to at least one vendor software, or the IoT device may obtain the at least one vendor software via a connected IoT resource, IoT gateway, a server hosting the at least one vendor software, or in some examples, the license manager. In some embodiments, the pre-loaded one or more instances of vendor software may be updated to a newer version if available. In various embodiments, one or more programs or applications from a plurality of different software vendors may be made available to each of the IoT device. According to one set of embodiments, a vendor, service provider, or in some embodiments, the license manager, may obtain, from each of the software vendors, a set of licenses for each of the different software programs/applications to be made available to one or more IoT devices. In some embodiments, a customer associated with the IoT device may provide a software license to be used on the IoT device. Accordingly, in some examples, instances of the vendor software may be pre-loaded, or an instance of vendor software may only be loaded after a license has been obtained and/or granted.

The method 300 may continue, at block 320, by receiving, via a license manager, a request to reserve a license for an instance of vendor software. In various embodiments, the IoT device, an IoT gateway, or a user device may generate a request to reserve an individual license for particular vendor software to be accessed (e.g., run on a remote device which the IoT device may access), or executed by the IoT. In various embodiments, the request may include information in addition to the vendor software being requested. For example, the request may include, without limitation, an identifier to identify the customer initiating the request, or the IoT device to run or access the vendor software instance, a priority level for the customer and/or IoT device, an SLA of the customer making the request, or any additional information that may be used in handling the request. In various embodiments, the IoT device may request the license directly from the license manager before the IoT device runs a vendor software instance. In other embodiments, the request may be received, by the license manager, from an IoT gateway, or an IoT resource remotely running the vendor software instance. In some embodiments, the request may be automatically generated by the IoT based on whether the IoT device is actively in use, or based on an SLA between the customer and a service provider (such as the vendor or provider of an IoT service). For example, in some embodiments, an SLA may establish that a vendor software instance will be available during a specified time window. Thus, the IoT device may be configured to generate the request for a software license in advance of the specified time window such that the software instance may be available for the entirety of the specified time window.

At optional decision block 325, a status of the IoT device may be confirmed by the license manager. In response to receiving the request for the instance of vendor software, in some embodiments the license manager may confirm that the IoT device has been provisioned properly. For example, the license manager may first confirm whether the IoT device (e.g., an identifier associated with the IoT device) has been registered with the IoT device vendor. In some embodiments, the license manager may further be configured to determine whether the IoT device is new, or newly activated. For example, the license manager may determine a version or model of the IoT device or software instance pre-loaded on the IoT device, and determine whether IoT device and/or associated vendor software is supported by an IoT device vendor or IoT service provider. The license manager may further determine whether the request has originated from an active IoT device, or an inactive IoT device. For example, an inactive IoT device may generate a request for instances of vendor software automatically without making use of the vendor software, or other associated IoT resources and services.

At decision block 330, the method 300 may continue by determining whether a license is available. As previously described, in various embodiments, the license manager may be configured to determine the availability of a license from a set of authorized licenses for the requested vendor software. In various embodiments, each of the licenses granted to other IoT devices, IoT resources, IoT gateways, or other components may be associated with an identifier of the device utilizing the license. Accordingly, the license manager may be configured to determine how many licenses are available. In further embodiments, the license manager may also determine when and how many licenses will become available in the future, and may notify the requesting device regarding when a license is expected to become available. In some embodiments, the license manager may maintain a queue of requesting devices if multiple devices request licenses that are not available. In another set of embodiments, the license manager may determine a priority level of the devices to which a license may have been granted. If the priority level of the device is lower than the priority level of a requesting device, the license manager may determine the license to be available to the requesting device with the higher priority level.

If a license is currently available to the IoT device, the method 300 may continue, at block 335, by registering the unique identifier in association with the available license. In various embodiments, the unique identifier for the requesting IoT device, or in some examples of the making the request, may be registered in association with the available license. The unique identifier may include, a network address such as an IP address, hardware address such as a MAC address, location information, serial number, model number, customer information or identification, IMEI, MEI, or other identifier suitable to uniquely identify the requesting device, such as the network element, host machine server, or VM instances.

In some embodiments, if the license manager determines that no licenses are currently available, the method 300 may continue, at optional block 345, by acquiring an additional license. Accordingly, in some examples, licenses for instances of vendor software may be acquired dynamically, up on request by an IoT device, customer, or other IoT resource. In other embodiments, additional licenses may be acquired according to a service agreement. Thus, if an SLA or other service agreement indicates that an instance of a vendor software should be available to the IoT device or an associated customer, the license manager may be configured to acquire an additional license for the vendor software. In further embodiments, acquiring additional licenses may include revoking previously granted licenses from other devices. For example, the license manager may be configured to determine that the IoT device has a higher priority level than a device with a previously granted license.

In some further embodiments, when the license manager determines that the number of available licenses reaches a predetermined threshold or limit (e.g., threshold number of available licenses), or that no available licenses for the software remain, the license manager may be configured to generate and transmit an alert to a customer, IoT device vendor, or IoT service provider. Accordingly, in some examples, the customer, IoT device vendor, or IoT service provider may acquire additional licenses. In some further embodiments, the license manager may be configured to automatically acquire additional licenses from a respective software vendor when the limit is reached.

At block 340, the method 300 may continue by granting the license to the requesting IoT device. The license manager may be configured to grant the available license of the set of licenses to the requesting device. In various embodiments, the license manager may directly transmit the license to the IoT device, or through an IoT gateway. In further embodiments, the license manager may grant the license to an IoT resource, such as a server for an IoT service being accessed by the IoT device. In some embodiments, granting the license may further include providing an instance of the requested vendor software. Accordingly, granting the license may include, in various embodiments, granting permission to execute, locally or remotely, an instance of vendor software, or granting access to an instance of vendor software.

In various embodiments, granting the license may further include revoking the previously granted license from a device with a lower priority level than the requesting device. In further embodiments, one or more licenses may be reserved from the set of available licenses for devices depending on a priority level. In further embodiments, licenses may be guaranteed to be available within a specific time from when the request was made.

In yet further embodiments, the license manager may be configured to grant a license with one or more restriction conditions. Accordingly, the license manager may be configured to receive or create one or more restrictions conditions, and to enforce the restriction conditions on the granted license. In some embodiments, a software vendor may provide the one or more restriction conditions to the license manager. The one or more restriction conditions may be provided as part of the set of licenses provided to the license manager. In another set of embodiments, the license manager may have an interface, such as, without limitation, a web app or portal, through which software vendors, IoT device vendors, IoT service providers, customers, and other users may create restriction conditions on licenses of the vendor software. Restriction conditions may include, without limitation, restrictions based on a region, state, country, continent, time zones, time, date, length of use, a limitation on the number of times a software instance may be run, IoT device, sensor, or other hardware specific restrictions, or any other restriction suitable for restricting use of a vendor software. Accordingly, in various embodiments, the license manager may be configured to monitor the IoT device or other IoT resources granted a license for the occurrence of the one or more restriction conditions. In some embodiments, the IoT device (or other IoT resource) may be configured to report the occurrence of a condition, while in other embodiments, the license manager may be configured to independently monitor for the occurrence of a restriction condition. In some embodiments, the license manager may further retrieve information about the IoT device through other connected devices, such one or more sensors, other IoT devices, an IoT gateway, an IoT middleware, or other IoT resource. For example, in some embodiments, the license manager may be configured to obtain global navigation satellite system (GNSS) information, such as global positioning system (GPS) information, about the IoT device via a coupled sensor (e.g., a GNSS receiver, GPS receiver).

At optional block 350, the method 300 may continue by updating the usage statistics of a vendor software. In various embodiments, the license manager may be configured to further track the number of times the limit of available licenses has been reached for statistical analysis. In various embodiments, the license manager may be configured to determine various usage statistics, including without limitation, which vendor software reaches its limit of available licenses, peak usage time for each of the vendor software, and average concurrent use for each of the vendor software. Accordingly, in various embodiments, the license manager may be configured to determine an average concurrent use of vendor software. Average concurrent use may include a calculation of an average number of the instances of a respective vendor software across an IoT platform over a time. For example, average concurrent use may be determined with a granularity of minutes, hours, days, weeks and months. Moreover, average concurrent usage may be determined by time of day, and time of year. The average concurrent use may also differ by IoT platform, including, without limitation, by location, by region, by customer, by service level offered by a service provider, and by service provider. Accordingly, after a license has been granted to the IoT device, the average concurrent use may be updated.

At optional block 355, the method 300 may continue by revoking unused licenses, based at least in part, on the usage statistics. In various embodiments, the license manager may be configured to revoke unused licenses for a vendor software based on the average concurrent use. Revoking licenses may include, in some embodiments, revoking licenses previously granted to IoT devices. In further embodiments, revoking a license may include reducing the total number of available licenses for the vendor software. For example, in various embodiments, the license manager may be configured to dynamically reduce the number of vendor software licenses based on, for example, a current average concurrent use, an actual number of instances of a respective vendor software currently in use, or a projected number of licenses to be used. In some examples, the license manager may reduce the number of available licenses in substantially real-time, or in other examples, periodically or upon request.

Figure 4:
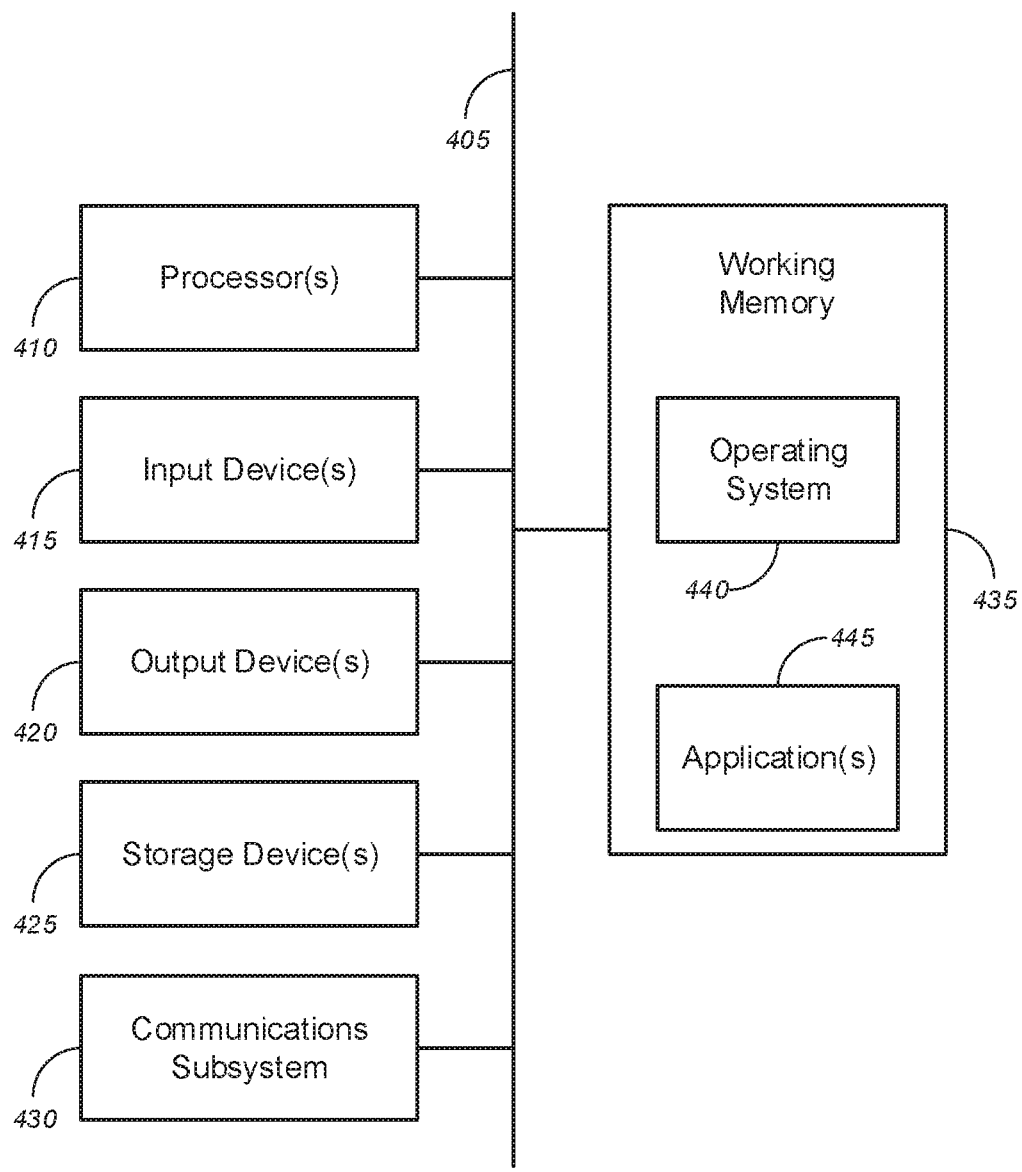
FIG. 4 is a schematic block diagram of a computer system for IoT devices and services software management, in accordance with various embodiments.

FIG. 4 is a schematic block diagram of a computer system 400 for IoT devices and services software management, in accordance with various embodiments. The computer system 400 may include embodiments of one or more components and devices previously described, such as a license manager, IoT device, IoT gateway, IoT middleware, and one or more IoT resources, which may perform the methods provided by various other embodiments, as described herein. It should be noted that FIG. 4 only provides a generalized illustration of various components, of which one or more (or none) of each may be utilized as appropriate. FIG. 4, therefore, broadly illustrates how individual system elements may be implemented in a relatively separated or relatively more integrated manner.

The computer system 400—which represents an embodiment of the IoT device as described above with respect to FIGS. 1-3—includes multiple hardware elements that may be electrically coupled via a bus 405 (or may otherwise be in communication, as appropriate). The hardware elements may include one or more processors 410, including, without limitation, one or more general-purpose processors and/or one or more special-purpose processors (such as microprocessors, digital signal processing chips, graphics acceleration processors, and microcontrollers); one or more input devices 415, which include, without limitation, a mouse, a keyboard, one or more sensors, and/or the like; and one or more output devices 420, which can include, without limitation, a display device, and/or the like.

The computer system 400 may further include (and/or be in communication with) one or more storage devices 425, which can comprise, without limitation, local and/or network accessible storage, and/or can include, without limitation, a disk drive, a drive array, an optical storage device, solid-state storage device such as a random-access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer system 400 might also include a communications subsystem 430, which may include, without limitation, a modem, a network card (wireless or wired), an IR communication device, a wireless communication device and/or chip set (such as a Bluetooth™ device, an 802.11 device, a WiFi device, a WiMax device, a WWAN device, a Z-Wave device, a ZigBee device, cellular communication facilities, etc.), and/or the like. The communications subsystem 430 may permit data to be exchanged with a network (such as the network described below, to name one example), with other computer or hardware systems, between data centers or different cloud platforms, and/or with any other devices described herein. In many embodiments, the computer system 400 further comprises a working memory 435, which can include a RAM or ROM device, as described above.

The computer system 400 also may comprise software elements, shown as being currently located within the working memory 435, including an operating system 440, which includes device drivers, executable libraries, and/or other code, such as one or more application programs 445, which may comprise computer programs provided by various embodiments (including, without limitation, the license manager, IoT middleware, and other applications utilized by the computer system 400 to perform the processes described above), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 425 described above. In some cases, the storage medium might be incorporated within a computer system, such as the system 400. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer system 400 and/or might take the form of source and/or installable code, which, upon compilation and/or installation on the computer system 400 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, single board computers, FPGAs, ASICs, and SoCs) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer system 400) to perform methods in accordance with various embodiments of the invention. According to a set of embodiments, some or all of the procedures of such methods are performed by the computer system 400 in response to processor 410 executing one or more sequences of one or more instructions (which might be incorporated into the operating system 440 and/or other code, such as an application program 445) contained in the working memory 435. Such instructions may be read into the working memory 435 from another computer readable medium, such as one or more of the storage device(s) 425. Merely by way of example, execution of the sequences of instructions contained in the working memory 435 might cause the processor(s) 410 to perform one or more procedures of the methods described herein.

The terms "machine readable medium" and "computer readable medium," as used herein, refer to any medium that participates in providing data that causes a machine to operate in a specific fashion. In an embodiment implemented using the computer system 400, various computer readable media might be involved in providing instructions/code to processor(s) 410 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 425. Volatile media includes, without limitation, dynamic memory, such as the working memory 435. In some alternative embodiments, a computer readable medium may take the form of transmission media, which includes, without limitation, coaxial cables, copper wire and fiber optics, including the wires that comprise the bus 405, as well as the various components of the communication subsystem 430 (and/or the media by which the communications subsystem 430 provides communication with other devices). In an alternative set of embodiments, transmission media can also take the form of waves (including, without limitation, radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 410 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 400. These signals, which might be in the form of electromagnetic signals, acoustic signals, optical signals, and/or the like, are all examples of carrier waves on which instructions can be encoded, in accordance with various embodiments of the invention.

The communications subsystem 430 (and/or components thereof) generally receives the signals, and the bus 405 then might carry the signals (and/or the data, instructions, etc. carried by the signals) to the working memory 435, from which the processor(s) 410 retrieves and executes the instructions. The instructions received by the working memory 435 may optionally be stored on a storage device 425 either before or after execution by the processor(s) 410.

Figure 5:
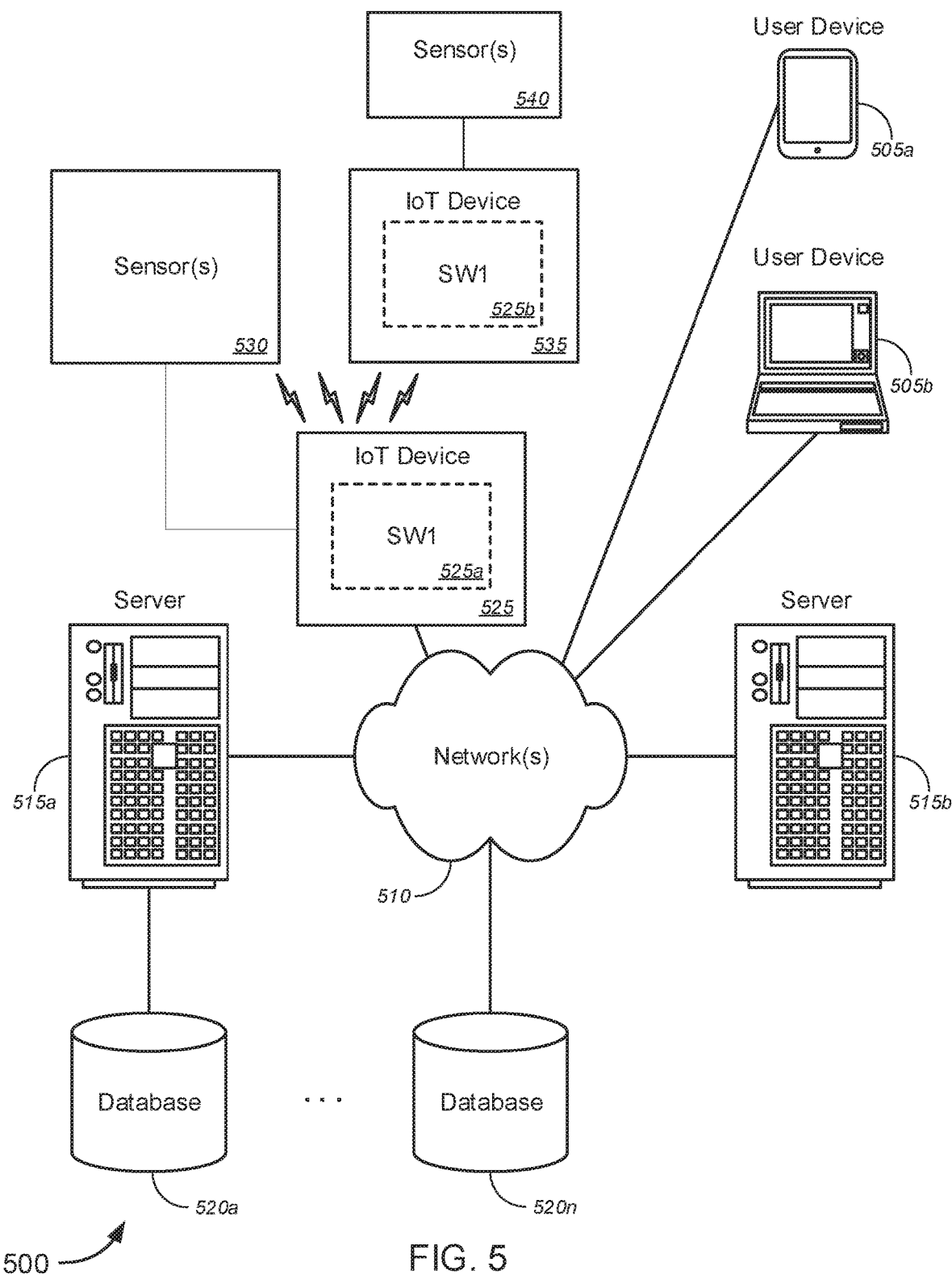
FIG. 5 is a block diagram illustrating a networked system of computing systems, IoT devices, and system hardware architecture, which may be used in accordance with various embodiments.

FIG. 5 is a block diagram illustrating a networked system 500 of computing systems, IoT devices, and system hardware architecture, which may be used in accordance with various embodiments. As noted above, a set of embodiments may include systems for providing scalable, dynamic, software management in an IoT environment. The system 500 may include one or more user devices 505. A user device 505 may include, merely by way of example, desktop computers, single-board computers, tablet computers, laptop computers, handheld computers, and the like, running an appropriate operating system. User devices 505 may further include cloud computing devices, IoT devices, servers, and/or workstation computers running any of a variety of operating systems. In some embodiments, the operating systems may include commercially-available UNIX™ or UNIX-like operating systems. A user device 505 may also have any of a variety of applications, including one or more applications configured to perform methods provided by various embodiments (as described above, for example, the license manager, or an IoT middleware), as well as one or more office applications, database client and/or server applications, and/or web browser applications. Alternatively, a user device 505 may include any other electronic device, such as a thin-client computer, Internet-enabled mobile telephone, and/or personal digital assistant, capable of communicating via a network (e.g., the network(s) 510 described below) and/or of displaying and navigating web pages or other types of electronic documents. Although the exemplary system 500 is shown with two user devices 505, any number of user devices 505 may be supported.

Certain embodiments operate in a networked environment, which can include a network(s) 510. The network(s) 510 can be any type of network familiar to those skilled in the art that can support data communications using any of a variety of commercially-available (and/or free or proprietary) protocols, including, without limitation, MQTT, CoAP, AMQP, STOMP, DDS, SCADA, XMPP, custom middleware agents, Modbus, BACnet, NCTIP 1213, Bluetooth, Zigbee/Z-wave, TCP/IP, SNA™, IPX™, AppleTalk™, and the like. Merely by way of example, the network(s) 510 can each include a local area network ("LAN"), including, without limitation, a fiber network, an Ethernet network, a Token-Ring™ network and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 515. Each of the server computers 515 may be configured with an operating system, including, without limitation, any of those discussed above, as well as any commercially (or freely) available server operating systems. Each of the servers 515 may also be running one or more applications, which can be configured to provide services to one or more clients 505 and/or other servers 515.

Merely by way of example, one of the servers 515 might be a data server, a web server, a server hosting a license manager, a IoT device(s), or the like, as described above. The servers 515 may include (or be in communication with) a web server, which can be used, merely by way of example, to process requests for web pages or other electronic documents from user computers 505. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 505 to perform previously described methods.

The server computers 515, in some embodiments, might include one or more application servers, which can be configured with one or more applications, programs (such as a license manager, IoT middleware, or one or more instances of various vendor software, as previously described), web-based services, or other IoT resources accessible by a client running on one or more of the user computers 505, IoT devices 525, 535, and/or other servers 515. Merely by way of example, the server(s) 515 can be one or more general purpose computers capable of executing programs or scripts in response to the user computers 505 and/or other servers 515, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™ Sybase™, IBM™, and the like, which can process requests from clients (including, depending on the configuration, dedicated database clients, API clients, web browsers, etc.) running on a user computer, user device, or customer device 505 and/or another server 515. In some embodiments, an application server can perform one or more of the processes for implementing media content streaming or playback, and, more particularly, to methods, systems, and apparatuses for implementing video tuning and wireless video communication using a single device in which these functionalities are integrated, as described in detail above. Data provided by an application server may be formatted as one or more web pages (comprising HTML, JavaScript, etc., for example) and/or may be forwarded to a user computer 505 via a web server (as described above, for example). Similarly, a web server might receive web page requests and/or input data from a user computer 505 and/or forward the web page requests and/or input data to an application server. In some cases, a web server may be integrated with an application server.

In accordance with further embodiments, one or more servers 515 can function as a file server and/or can include one or more of the files (e.g., application code, data files, etc.) necessary to implement various disclosed methods, incorporated by an application running on a user computer 505 and/or another server 515. Alternatively, as those skilled in the art will appreciate, a file server can include all necessary files, allowing such an application to be invoked remotely by a user computer, user device, or customer device 505 and/or server 515.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 520a-520n (collectively, "databases 520"). The location of each of the databases 520 is discretionary: merely by way of example, a database 520a might reside on a storage medium local to (and/or resident in) a server 515a (or alternatively, user device 505). Alternatively, a database 520n can be remote from any or all of the computers 505, 515, 525, 535 so long as it can be in communication (e.g., via the network 510) with one or more of these. In a particular set of embodiments, a database 520 can reside in a storage-area network ("SAN") familiar to those skilled in the art. (Likewise, any necessary files for performing the functions attributed to the computers 505, 515, 525, 535 can be stored locally on the respective computer and/or remotely, as appropriate.) In one set of embodiments, the database 520 may be a software license database, or a database storing one or more instances of a vendor software. In some embodiments, the databases 520 may include relational databases, for example, an Oracle database, that is adapted to store, update, and retrieve data in response to SQL-formatted commands. The database might be controlled and/or maintained by a database server, as described above, for example.

The system 500 might further include one or more IoT devices 525, 535. In various embodiments, the IoT devices 525, 535 may be communicatively coupled to each other directly, or alternatively via network(s) 510. An IoT device 525, 535, like the user device 505, may include, without limitation, desktop computers, tablet computers, laptop computers, handheld computers, single-board computers and the like, running an appropriate operating system. IoT devices 525, 535 may further include cloud computing devices, servers, and/or workstation computers running any of a variety of operating systems. In some embodiments, the operating systems may include commercially-available UNIX™ or UNIX-like operating systems. Either or both of the IoT devices 525, 535 may also have any of a variety of applications, including one or more applications configured to perform methods provided by various embodiments (as described above, for example, one or more instances of different vendor software, an IoT middleware, or in some embodiments, a license manager), as well as one or more office applications, database client and/or server applications, and/or web browser applications. Although the exemplary system 500 is shown with two IoT devices 525, 535, any number of user IoT devices may be supported.

Each of the IoT device 525, 535 may further be coupled, respectively, to one or more sensors 530, 540. The one or more sensors 530, 540 may include various types of sensors, including, without limitation, photodetectors, scales, gyroscopes, global positioning system (GPS) receiver, cameras, microphones, moisture readers, thermometers, smart-grid sensors, accelerometers, rangefinders, motion detectors, among many other types of sensors. In some embodiments, the one or more sensors 530, 540 may be accessible by other device, via network(s) 510. For example, a user device 505 may access data generated by either of the one or more sensors 530, 540, via the network 510. The IoT devices 525, 535 may further include one or more instances of a vendor software (e.g., SW1 525a, and SW1 525b). In some embodiments, an IoT device 525, 535 may be configured to be deployed with one or more instances of the vendor software, or to obtain one or more instances of a vendor software SW1 525a, 525b. In some embodiments, the IoT devices 525, 535 may further be configured to obtain a license for the one or more instances of the vendor software SW1 525a, 525b, from a license manager, as previously described.

These and other functions of the system 500 (and its components) are described in greater detail above with respect to FIGS. 1-3.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to certain structural and/or functional components for ease of description, methods provided by various embodiments are not limited to any single structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in sequentially for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a specific structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to one embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A system comprising: an internet of things (IoT) device in communication with one or more sensors; a database including one or more sets of authorized licenses, each set of authorized licenses associated with a respective vendor software; a license manager in communication with the IoT device and the database, the license manager comprising: a processor; a non-transitory computer readable medium comprising instructions executable by the processor to: receive, via the IoT device, a request to reserve a license of a first set of one or more authorized licenses associated with a first vendor software; determine, via the database, an availability of the license associated with the first vendor software; register, via the database, a unique identifier of the IoT device responsive to determining that the license is available, wherein by registration the unique identifier is associated with the license; revoking the license from another IoT device with a lower priority level of license availability than a priority level of license availability for the IoT device; and grant the license to the IoT device; determine, via an IoT device vendor, whether one of the IoT device or the first vendor software is supported by the IoT device vendor, and deny the license to the IoT device responsive to determining that the IoT device or the vendor software is not supported by the IoT device vendor.

2. The system of claim 1, wherein the instructions are further executable by the processor to:
   determine a service level agreement to be applied to the IoT device or a customer associated with the IoT device; and
   determine, based on the service level agreement, a priority level of license availability of the license for the first vendor software.

3. The system of claim 2, wherein the instructions are further executable by the processor to:
   ensure availability of the license according to the service level agreement.

4. The system of claim 2, wherein the instructions are further executable by the processor to:
   reserve, at the database, one or more of the first set of licenses based, at least in part, on the priority level of license availability.

5. The system of claim 1, wherein the instructions are further executable by the processor to:
   create a restriction condition on the use of the license; and
   revoke the license upon an occurrence of the restriction condition.

6. The system of claim 5, wherein one or more sensors includes a global navigation satellite system (GNSS) receiver, wherein the restriction condition is one of a geographic or temporal restriction, wherein the instructions are further executable by the processor to:
   determine, via the IoT device, at least one of a location or local time of the IoT device based on data received from the GNSS receiver; and
   deny, based at least in part on the at least one of the location or local time of the IoT device, granting the license to the IoT device.

7. The system of claim 1, wherein the instructions are further executable by the processor to:
   acquire, from a first software vendor associated with the first vendor software, one or more additional licenses in response to determining that the license is not available; and
   grant, responsive to the request, a second license of the one or more additional licenses to the IoT device.

8. The system of claim 1, wherein the instructions are further executable by the processor to:
   reduce, based at least in part on a usage statistic for the first vendor software, a total number of licenses in the first set of one or more authorized licenses associated with the first vendor software, wherein the usage statistic includes at least one of a current use, average concurrent use, or a peak usage of the first vendor software.

9. The system of claim 1, wherein the instructions are further executable by the processor to:
   determine, via the database, a total number of available licenses in the first set of one or more authorized licenses associated with the first vendor software;

generate an alert responsive to the total number of available licenses reaching a threshold number, indicating that the number of available licenses has reached the threshold number; and transmit the alert to one of the IoT device, customer associated with the IoT device, an IoT device vendor, or IoT service provider.

10. An apparatus comprising: a processor; a non-transitory computer readable medium comprising instructions executable by the processor to: receive, from an IoT device, a request to reserve a license of a first set of one or more authorized licenses associated with a first vendor software; determine, via a license database, an availability of the license associated with the first vendor software; register, via the license database, a unique identifier of the IoT device responsive to determining that the license is available, wherein by registration the unique identifier is associated with the license; revoke the license from another IoT device with a lower priority level of license availability than a priority level of license availability for the IoT device; and grant the license to the IoT device; determine, via an IoT device vendor, whether one of the IoT device or the first vendor software is supported by the IoT device vendor, and deny the license to the IoT device responsive to determining that the IoT device or the vendor software is not supported by the IoT device vendor.

11. The apparatus of claim 10, wherein the instructions are further executable by the processor to:

determine a service level agreement to be applied to the IoT device or a customer associated with the IoT device; and determine, based on the service level agreement, a priority level of license availability of the license for the first vendor software.

12. The apparatus of claim 11, wherein the instructions are further executable by the processor to:

ensure availability of the license according to the service level agreement.

13. The apparatus of claim 11, wherein the instructions are further executable by the processor to:

reserve, at the database, one or more of the first set of licenses based, at least in part, on the priority level of license availability.

14. The apparatus of claim 10, wherein the instructions are further executable by the processor to:

acquire, from a first software vendor associated with the first vendor software, one or more additional licenses in response to determining that the license is not available; and grant, responsive to the request, a second license of the one or more additional licenses to the IoT device; and reduce, based at least in part on a usage statistic for the first vendor software, a total number of licenses in the first set of one or more authorized licenses associated with the first vendor software, wherein the usage statistic includes at least one of a current use, average concurrent use, or a peak usage of the first vendor software.

15. The apparatus of claim 10, wherein the instructions are further executable by the processor to:

create a restriction condition on the use of the license; and revoke the license upon an occurrence of the restriction condition.

16. The apparatus of claim 15, wherein the restriction condition is one of a geographic or temporal restriction, wherein the instructions are further executable by the processor to:

determine, via the IoT device, at least one of a location or local time of the IoT device; and deny, based at least in part on the at least one of the location or local time of the IoT device, granting the license to the IoT device.

17. A method comprising: receiving, via a license manager, a request to reserve a license of a first set of one or more authorized licenses associated with a first vendor software; determining, via the license manager, an availability of the license associated with the first vendor software; registering, via the license manager, a unique identifier of the IoT device, in response to determining that the license is available, with a database including the first set of one or more authorized licenses associated with the first vendor software, wherein by registration the unique identifier is associated with the license; revoking the license from another IoT device with a lower priority level of license availability than a priority level of license availability for the IoT device; and granting, via the license manager, the license to the IoT device; determining, via the license manager, whether one of the IoT device or the first vendor software is supported by an IoT device vendor, and deny the license to the IoT device responsive to determining that the IoT device or the vendor software is not supported by the IoT device vendor.

18. The method of claim 17, further comprising:

acquiring, via the license manager, one or more additional licenses in response to determining that the license is not available; and granting, via the license manager, a second license of the one or more additional licenses to the IoT device; and reducing, via the license manager, based at least in part on a usage statistic for the first vendor software, a total number of licenses in the first set of one or more authorized licenses associated with the first vendor software, wherein the usage statistic includes at least one of a current use, average concurrent use, or a peak usage of the first vendor software.

19. The method of claim 16, further comprising:

creating, via the license manager, a restriction condition on the use of the license; and revoking, via the license manager, the license upon an occurrence of the restriction condition.

\* \* \* \* \*